Figure 1:
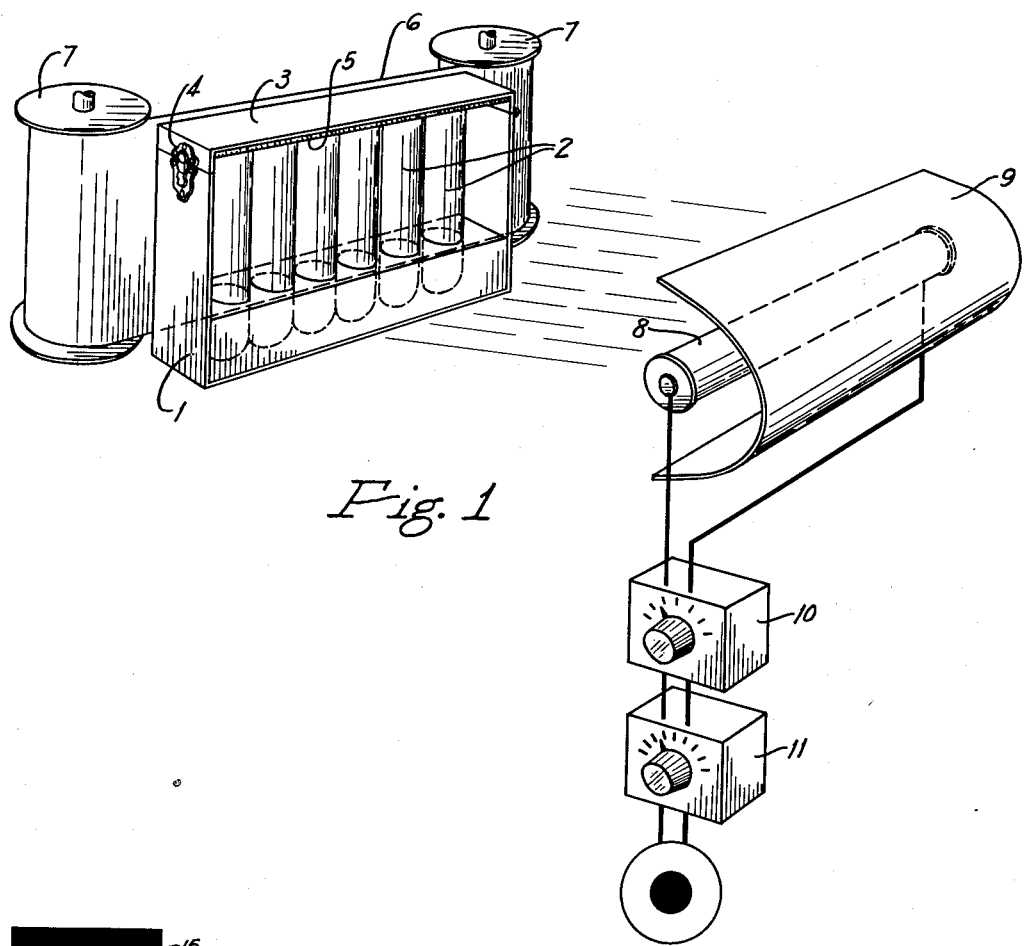

Dec. 6, 1955

C. M. WORLEY 2,725,782

APPARATUS FOR RECORDING RATE OF SEDIMENTATION IN LIQUIDS

Filed Aug. 19, 1952

INVENTOR.
CARL MILTON WORLEY
BY
Brown, Critchlow, Flick & Peckham
HIS ATTORNEYS

United States Patent Office 2,725,782
Patented Dec. 6, 1955

2,725,782

APPARATUS FOR RECORDING RATE OF SEDIMENTATION IN LIQUIDS

Carl Milton Worley, Pittsburgh, Pa.

Application August 19, 1952, Serial No. 305,180

3 Claims. (Cl. 88—14)

This invention relates to apparatus for recording the rate of sedimentation in liquids containing opaque matter in suspension and is particularly useful for determining and recording the rate of sedimentation in samples of human blood.

For the purpose of this disclosure, blood may be considered as composed of a transparent liquid plasma in which are suspended opaque blood cells of slightly greater density. In samples of freshly drawn blood, those cells are uniformly dispersed throughout the plasma, giving to the whole blood its characteristic opacity. However, when the blood is left standing in a container, provided its fluidity is maintained by the addition of an anti-coagulant, these opaque blood cells slowly settle under the influence of gravity and leave relatively cell-free, transparent plasma above them. The boundary line between the plasma and the topmost layer of settling cells is sharply defined, and the downward movement of that boundary line is used to measure the rate of blood sedimentation.

It is recognized that the rate of sedimentation is markedly increased in blood samples of persons suffering from many conditions of disease, representing a non-specific blood reaction having much the same general significance as fever or pulse acceleration. Accordingly, the determination of the rate of blood sedimentation is frequently used in clinical examinations to confirm the presence or absence of some organic disease, or to indicate the possible presence of such disease when a preliminary diagnosis has failed to reveal it.

Heretofore, blood sedimentation tests have been made by visual examinations of a blood sample in a test tube by an observer who notes the distance that the boundary layer of blood cells is lowered during certain intervals over a given time. This procedure is not entirely satisfactory, because it is subject to human errors of observation and is both time consuming and burdensome.

It is among the objects of this invention to provide an apparatus that will automatically measure the rate of sedimentation in one or more samples of blood during each desired interval over a desired period of time, that will produce an accurate and permanent record of such rate of sedimentation, and that is inexpensive to manufacture and simple to operate.

The apparatus of this invention comprises one or more containers each holding a sample of blood to be tested and each being made of a material that permits the passage of light therethrough. A light sensitive material is supported at one side of each container, and at the opposite side is mounted a light source that is adapted to emit a broad beam of light having substantially parallel rays of substantially uniform intensity that are directed towards the containers and the light sensitive material behind them. Means are provided for protecting the light sensitive material from exposure to extraneous light and for causing the light source to emit brief flashes of light at desired intervals. When a sample of blood, to which has been added a suitable anti-coagulant, is placed in one of the containers, and when light is thereafter briefly emitted from the light source at desired intervals, each emission will expose that portion of the sensitized material behind the container that is not occluded by the opaque blood cells therein. As the blood settles, leaving clear plasma above it, each exposure of the light sensitive material will record the height of the boundary layer between cells and plasma at the moment of exposure. When the blood cells have finally settled to a closely packed formation at the bottom of the container, the light sensitive material will have recorded in irregular stepped area gradations from more exposed to less exposed areas the amount of sedimentation that occurred during each interval between emissions of light from the light source.

Figure 2:
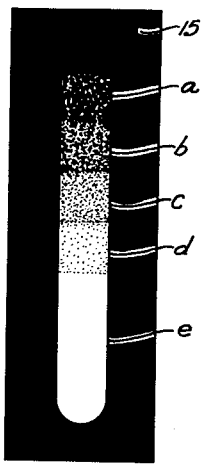

The preferred embodiment of the present invention is illustrated in the accompanying drawings, in which Fig. 1 is an elevation view, which is partly isometric and partly diagrammatic, of the recording apparatus without its containing light-proof box; and Fig. 2 is illustrative of the general type of record made by this apparatus in measuring the rate of blood sedimentations.

Referring to the drawings, a rectangular rack 1 is used to support a row of glass test tubes 2, in which may be placed different samples of blood to be tested simultaneously. The rack is provided with a hinged top 3, which may be locked by the latch 4 in its closed position to hold the tubes securely in the rack. The underside of that top may be lined with a sheet of sealing material 5 to seal the open ends of the test tubes, so that the entire rack and its contained tubes, with the samples of blood therein, may be inverted and shaken to thoroughly mix the plasma and blood cells as hereinafter described.

At one side of the test tubes, or behind them as shown in Fig. 1, a strip of light sensitive material 6 is supported by winding and unwinding spools 7. The light sensitive material may be of any suitable type that has the desired range of sensitivity, and includes photographic film and printing papers of various kinds.

On the opposite side of the test tubes is mounted a source of light 8, here represented as a single cold cathode fluorescent tube; but other types of light source may be used, including ultraviolet light for use with diazo dye types of sensitized printing papers. It is preferable that the light source provide a relatively broad beam of light that has substantially parallel rays of substantially uniform intensity. One way of providing this is to mount a parabolic reflector 9 adjacent to the light source, so as to direct the light beam towards the test tubes and the light sensitive material behind them. The reflector may, however, be dispensed with, where the light source provides a sufficiently general and uniform illumination over the effective area of the light sensitive material, as for example, by a light source comprising a plurality of superimposed fluorescent tubes placed behind a diffusing medium of ground glass or the like.

Since the light sensitive material 6 is not continuously exposed to the source of light 8, but is only briefly exposed at desired intervals, there is provided an exposure timer 10 and an interval timer 11 to control, respectively, the duration of each light flash and the interval of time between flashes. Both of those timers may be of conventional design that permits a selection of exposure and interval times most suitable for the characteristics of whatever light sensitive material is used.

The apparatus above described is preferably enclosed in a box (not shown in the drawings) that will exclude extraneous light and permit the insertion and withdrawal of the test tubes, the rack, and the light sensitive material wound on one of the spools. The design of such an enclosing box may take a variety of forms and constitutes no part of this invention.

It will usually be found desirable to provide etched scale markings on each of the test tubes to measure the original height of the blood therein and the progressively lower height of the upper surface of the sedimenting cells. Each test tube may also be provided with an identifying symbol etched thereon, so that the shadow of such symbol, like the shadows of the scale markings, may be projected on the light sensitive material during each exposure when the light source is illuminated. Other pertinent information can likewise be recorded by inserting between each test tube and the light sensitive material behind it a film of transparent material, or a glass slide, having the desired data printed or etched thereon.

In using this apparatus, a blood sample of given volume, containing a suitable anti-coagulant to maintain its fluidity, is placed in each test tube, and the tubes are placed in the rack and secured therein by closing and latching the top of the rack. The rack may then be inverted and shaken to mix all of the blood samples simultaneously and thoroughly, since the samples may have been taken at different times and sedimentation may have already begun in some of them. The rack is then placed in its containing box between the light sensitive material and the light source, and the interval timer is started. The initial flash of light should occur promptly and will expose those portions of the light sensitive material that are not covered by the projected shadow of the opaque blood sample, or by the shadows of the scale markings and such other data markings as may have been inserted in the manner previously described. In other words, the initial flash of light will record the height of the surface level of the blood sample in each test tube, since the blood cells therein have just been thoroughly mixed with the plasma and the whole sample is relatively opaque to the transmission of light. The next flash of light will occur after an interval determined by the interval timer and will again expose the same areas of the light sensitive material as were previously exposed, plus an additional area represented by the amount of clear plasma above the topmost layer of sediment cells. Referring to Fig. 2, the dark background area is alone exposed on the initial flash of light at the beginning of the first interval. That same area, plus the area designated by the letter $a$, is exposed on the second flash of light at the end of the first interval. In other words, at the end of the first interval, the background portion of the light sensitive material will have been twice exposed and will have received what may be termed two quanta of light, while the area designated $a$, which has been exposed but once, will have received only one quantum of light. On each successive exposure at the end of each sucessive interval during which sedimentation has occurred, successive portions of the light sensitive material will record the amount of sedimentation that has occurred during that interval. When sedimentation has ceased, or when a desired number of exposures have been made, the light sensitive material will have been exposed in stepped area progressions from more exposed to less exposed areas, i. e., each successive area will have been exposed to one less quantum of light than the area immediately above it; and the height of each area will accurately measure the amount of sedimentation that has occurred during a particular interval of time.

When the light sensitive material is developed, or otherwise fixed, a permanent record of the rate of sedimentation of a particular blood sample will have been made. A hypothetical record of this kind is illustrated in Fig. 2, where the background area 15 (which received the largest quanta of light) is the darkest area on the record; and the successively lighter areas $a$, $b$, $c$, and $d$ show the amount of sedimentation between successive exposures at given intervals. The unexposed area $e$ is the lightest of all and indicates the height of the topmost layer of sedimenting cells at the end of the fourth and final interval. With the proper selection of a light sensitive material having a wide range of sensitivity and of the duration of each exposure (as controlled by the exposure timer according to the characteristics of the light sensitive material that is used), the foregoing stepped area gradations will be clearly distinguishable by their contrasting density and may be readily compared with a standard record of normal blood sedimentation prepared under the same timing conditions, thereby facilitating the detection of any variation between the sedimentation rate of the blood sample being tested and the sedimentation rate of a normal sample.

It is among the advantages of this invention that the apparatus herein described is readily portable, is convenient and simple to use, and can automatically record the sedimentation rates of a number of blood samples simultaneously. The sedimentation record that is made is permanent and available for future reference and comparison. It is also possible with this apparatus to select desired intervals between successive exposures, so as to make an accurate record of the rate of sedimentation during any portion of the period in which that rate is to be determined, including critical periods where changes of rate may be particularly significant.

While this invention has been described in connection with the determination and recording of the rate of blood sedimentation, it will be apparent that this same apparatus can be used to test the rate of sedimentation in other sediment containing liquids and constitutes an improvement over the existing technique of visually reading and manually recording with variable accuracy, the rate of sedimentation in such liquids.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for measuring and recording the rate of sedimentation in a sample of blood, comprising a container of light-passing material for holding the blood sample to be tested, means for holding the container in a fixed position, and means for supporting light sensitive material in a fixed position at one side of the container, a light source supported at the opposite side of the container, a timer mechanism for lighting the light source for brief periods at predetermined intervals, whereby light from the light source will reach the light sensitive material only through that portion of the container thta is substantially free of opaque cells above the level of sedimenting cells.

2. Apparatus for measuring and recording simultaneously the rate of sedimentation in samples of human blood containing plasma and opaque cells, comprising a plurality of containers of light-passing material for holding the separate blood samples to be tested, a rack for supporting said containers in a row, means for supporting light sensitive material in a fixed position at one side of the row of containers, a light source supported at the opposite side of said row, reflecting means to direct light from the light source in substantially parallel rays of substantially uniform intensity towards the containers and the light sensitive material on the other side thereof, an exposure timer for controlling the duration of light emission from the light source, and an interval timer for controlling the period of time between successive emissions of light, whereby each time that light is emitted from the light source it will pass through only those portions of the containers that are above the topmost layer of sedimenting opaque cells therein to measure and record on the light sensitive material the height of that layer.

3. Apparatus in accordance with claim 2, containing the following additional elements: a lid for said rack, sealing material attached to the underside of the lid and adapted to contact and seal the containers therein when the lid is closed, and latch means for locking the lid in its closed position.

References Cited in the file of this patent

UNITED STATES PATENTS

| | | |
|---|---|---|
| 1,044,835 | Wattles | Nov. 19, 1912 |
| 1,513,372 | Clark | Oct. 28, 1924 |
| 1,648,369 | Svedberg et al. | Nov. 8, 1927 |
| 1,967,895 | Marvin | July 24, 1934 |
| 2,104,525 | Proskouriakoff | Jan. 4, 1938 |
| 2,419,914 | Pamphilon | Apr. 29, 1947 |

FOREIGN PATENTS

| | | |
|---|---|---|
| 642,167 | Germany | Feb. 24, 1937 |